United States Patent
Bao et al.

(10) Patent No.: US 11,907,329 B2
(45) Date of Patent: *Feb. 20, 2024

(54) CONVOLUTION CALCULATION APPARATUS AND METHOD

(71) Applicant: Xiamen SigmaStar Technology Ltd., Fujian (CN)

(72) Inventors: Fabo Bao, Fujian (CN); Donghao Liu, Fujian (CN); Wei Zhu, Fujian (CN); Chengwei Zheng, Fujian (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 366 days.

This patent is subject to a terminal disclaimer.

(21) Appl. No.: 17/328,006

(22) Filed: May 24, 2021

(65) Prior Publication Data

US 2022/0092151 A1 Mar. 24, 2022

(30) Foreign Application Priority Data

Sep. 18, 2020 (CN) .......................... 202010988022.9

(51) Int. Cl.
*G06F 17/15* (2006.01)
*G06F 9/54* (2006.01)

(52) U.S. Cl.
CPC ............ *G06F 17/153* (2013.01); *G06F 9/545* (2013.01)

(58) Field of Classification Search
CPC ....... G06F 17/153; G06F 9/545; G06N 3/045; G06N 3/063
See application file for complete search history.

(56) References Cited

U.S. PATENT DOCUMENTS

2016/0358069 A1* 12/2016 Brothers ................. G06F 7/764
2018/0046900 A1*  2/2018 Dally .................... G06N 3/082
(Continued)

OTHER PUBLICATIONS

Jong Hwan Ko, "Design and Analysis of a Neural Network Inference Engine Based on Adaptive Weight Compression," Feb. 2, 2018, EEE Transactions on Computer-Aided Design of Integrated Circuits and Systems, vol. 38, No. 1, Jan. 2019, pp. 109-118.*

(Continued)

*Primary Examiner* — Omar S Ismail
(74) *Attorney, Agent, or Firm* — Edell, Shapiro & Finnan, LLC (57) ABSTRACT

A convolution calculation apparatus applied for convolution calculation of a convolution layer includes a decompression circuit, a data combination circuit and a calculation circuit. The decompression circuit decompresses compressed weighting data of a convolution kernel of the convolution layer to generate decompressed weighting data. The data combination circuit combines the decompressed weighting data and non-compressed data of the convolution kernel to restore a data order of weighting data of the convolution kernel. The calculation circuit performs calculation according to the weighting data of the convolution kernel and input data of the convolution layer. Since the compressed weighting data of the convolution kernel is transmitted to the convolution calculation apparatus in advance, the compressed weighting data is first decompressed and then convolution calculation is performed accordingly, hence reducing the storage amount and transmission bandwidth used by the convolution kernel in an electronic apparatus.

9 Claims, 10 Drawing Sheets

(56) References Cited

U.S. PATENT DOCUMENTS

| | | | | |
|---|---|---|---|---|
| 2018/0082181 | A1* | 3/2018 | Brothers | G06N 3/045 |
| 2018/0189642 | A1* | 7/2018 | Boesch | G06F 30/327 |
| 2019/0087713 | A1* | 3/2019 | Lamb | G06N 3/045 |
| 2019/0147327 | A1* | 5/2019 | Martin | G06N 3/063 |
| | | | | 706/15 |
| 2019/0156215 | A1* | 5/2019 | Matveev | G06N 20/10 |
| 2019/0197420 | A1* | 6/2019 | Singh | G06N 3/063 |
| 2019/0348999 | A1* | 11/2019 | Pal | H03M 7/4062 |
| 2019/0392287 | A1* | 12/2019 | Ovsiannikov | G06N 3/04 |

OTHER PUBLICATIONS

James Garland, "Low Complexity Multiply-Accumulate Units for Convolutional Neural Networks with Weight-Sharing," Aug. 2018, ACM Transactions on Architecture and Code Optimization, vol. 15, No. 3, Article 31, pp. 31:1-31:11.*

Jian Cheng, "Quantized CNN: A Unified Approach to Accelerate and Compress Convolutional Networks," Dec. 8, 2017, IEEE Transactions on Neural Networks and Learning Systems, vol. 29, No. 10, Oct. 2018, pp. 4730-4735.*

Angshuman Parashar, "SCNN: An Accelerator for Compressed-sparse Convolutional Neural Networks," Jul. 24, 2017, ACM SIGARCH Computer Architecture News, vol. 45, Issue 2May 2017, pp. 27-31.*

* cited by examiner

| 01 | 00 | 03 | 00 | FB | 09 | 0A | 00 | 06 | 00 | 00 | 00 |
|----|----|----|----|----|----|----|----|----|----|----|----|
| 00 | 07 | 00 | 00 | 00 | 01 | 01 | 00 | 00 | 00 | 05 | FF |
| 02 | 00 | 00 | FF | 00 | 03 | 00 | 00 | 00 | FE | 00 | 00 |
| 0A | 00 | 00 | 08 | 00 | 00 | 18 | 00 | 00 | FF | 00 | 00 |
| 00 | 00 | FF | 00 | 00 | F6 | 00 | 00 | FF | 00 | 00 | 0B |

FIG. 4

| 01 | 00 | 03 | 00 | FB | 09 | 0A | 00 | 06 | 00 | 00 | 00 |
|----|----|----|----|----|----|----|----|----|----|----|----|
| 00 | 07 | 00 | 00 | 00 | 01 | 01 | 00 | 00 | 00 | 05 | FF |
| 02 | 00 | 00 | FF | 00 | 03 | 00 | 00 | 00 | FE | 00 | 00 |
| 0A | 00 | 00 | 08 | 00 | 00 | 18 | 00 | 00 | FF | 00 | 00 |
| 00 | 00 | FF | 00 | 00 | F6 | 00 | 00 | FF | 00 | 00 | 0B |

↓ Convert 2's complements to original numbers

| 01 | 00 | 03 | 00 | 85 | 09 | 0A | 00 | 06 | 00 | 00 | 00 |
|----|----|----|----|----|----|----|----|----|----|----|----|
| 00 | 07 | 00 | 00 | 00 | 01 | 01 | 00 | 00 | 00 | 05 | 81 |
| 02 | 00 | 00 | 81 | 00 | 03 | 00 | 00 | 00 | 82 | 00 | 00 |
| 0A | 00 | 00 | 08 | 00 | 00 | 18 | 00 | 00 | 81 | 00 | 00 |
| 00 | 00 | 81 | 00 | 00 | 86 | 00 | 00 | 81 | 00 | 00 | 0B |

| 0 | 0 | 0 | 0 | 0 | 1 | 1 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 1 | 0 | 0 | 1 | 0 | 0 | 3 | 0 | 0 | 0 | 0 | 0 |
| 0 | 0 | 0 | 0 | 0 | 0 | 0 | 0 | 0 | 0 | 0 | 1 |

| Original character | Huffman code |
|---|---|
| 0 | 1 |
| 1 | 01 |
| 3 | 00 |

FIG. 9

| 0 | 0 | 0 | 0 | 0 | 1 | 1 | 0 | 0 | 0 | 0 | 0 |
|---|---|---|---|---|---|---|---|---|---|---|---|
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 1 | 0 | 0 | 1 | 0 | 0 | 3 | 0 | 0 | 0 | 0 | 0 |
| 0 | 0 | 0 | 0 | 0 | 0 | 0 | 0 | 0 | 0 | 0 | 1 |

↓ Huffman coding replacement

| 1 | 1 | 1 | 1 | 1 | 01 | 01 | 1 | 1 | 1 | 1 | 1 |
|---|---|---|---|---|---|---|---|---|---|---|---|
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| 01 | 1 | 1 | 01 | 1 | 1 | 00 | 1 | 1 | 1 | 1 | 1 |
| 1 | 1 | 1 | 1 | 1 | 1 | 1 | 1 | 1 | 1 | 1 | 01 |

CONVOLUTION CALCULATION APPARATUS AND METHOD

This application claims the benefit of China application Serial No. CN 202010988022.9, filed on Sep. 18, 2020, the subject matter of which is incorporated herein by reference.

BACKGROUND OF THE INVENTION

Field of the Invention

The invention relates to a convolution calculation technique, and more particularly, to a convolution calculation apparatus and method.

Description of the Related Art

Artificial intelligence is currently applied in an increasing number of fields. In artificial intelligence, an electronic apparatus can use training samples for machine learning of a calculation model (i.e., a neural network model). Then, the electronic apparatus can use the trained calculation model to perform certain tasks such as classification and prediction. For example, a convolutional neural network (CNN) can be used for image identification. However, the data of a convolution kernel of certain convolution layers is massive, causing the use of greater system resources involved in the convolution processing of the convolution layers in the electronic apparatus.

SUMMARY OF THE INVENTION

In view of the issues of the prior art, it is an object of the present invention to provide a convolution calculation apparatus and method for improving the prior art.

The present invention provides a convolution calculation apparatus applied to convolution calculation of a convolution layer. The convolution calculation apparatus includes a decompression circuit, a data combination circuit and a calculation circuit. The decompression circuit decompresses compressed weighting data of a convolution kernel of the convolution layer to generate decompressed weighting data. The data combination circuit combines the decompressed weighting data and non-compressed weighting data of the convolution kernel to restore a data order of weighting data of the convolution kernel. The calculation circuit performs calculation according to the weighting data of the convolution kernel and input data of the convolution layer.

The present invention further provides a convolution calculation apparatus applied to convolution calculation of a convolution layer. The convolution calculation apparatus includes a decompression circuit and a calculation circuit. The decompressed circuit decompresses compressed weighting data of a convolution kernel of the convolution layer to generate decompressed weighting data. The calculation circuit performs calculation according to the decompressed weighting data and input data of the convolution layer. The compressed weighting data and the input data are respectively stored in different blocks of a memory.

The present invention further provides a convolution calculation method applied to convolution calculation of a convolution layer. The convolution calculation method includes decompressing compressed weighting data of a convolution kernel of the convolution layer to generate decompressed weighting data, and performing calculation according to the decompressed weighting data and input data of the convolution layer. The compressed weighting data and the input data are respectively stored in different blocks of a memory.

Features, implementation details and effects of the present invention are described in detail in preferred embodiments with the accompanying drawings below.

DETAILED DESCRIPTION OF THE INVENTION

Referring to the drawings, the same numerals represent the same elements, and the principle is exemplified by implementation in an appropriate operation environment. The description below is based on specific embodiments illustrated by the examples, and is not to be construed as limitations to other specific embodiments not described herein.

The present invention provides a data processing method applied to a convolution calculation apparatus and a corresponding convolution calculation apparatus. Weighting data of a convolution kernel in a convolution layer is compressed, and the decompressed weighting data is then inputted into the corresponding convolution calculation apparatus. When the convolution calculation apparatus performs calculation, the compressed weighting data is decompressed to thereby reduce system resources occupied by the weighting data of the convolution kernel. In practice, the convolution calculation apparatus of the present invention is applicable to electronic apparatuses such as smartphones, tablet computers and security control devices.

Figure 1:
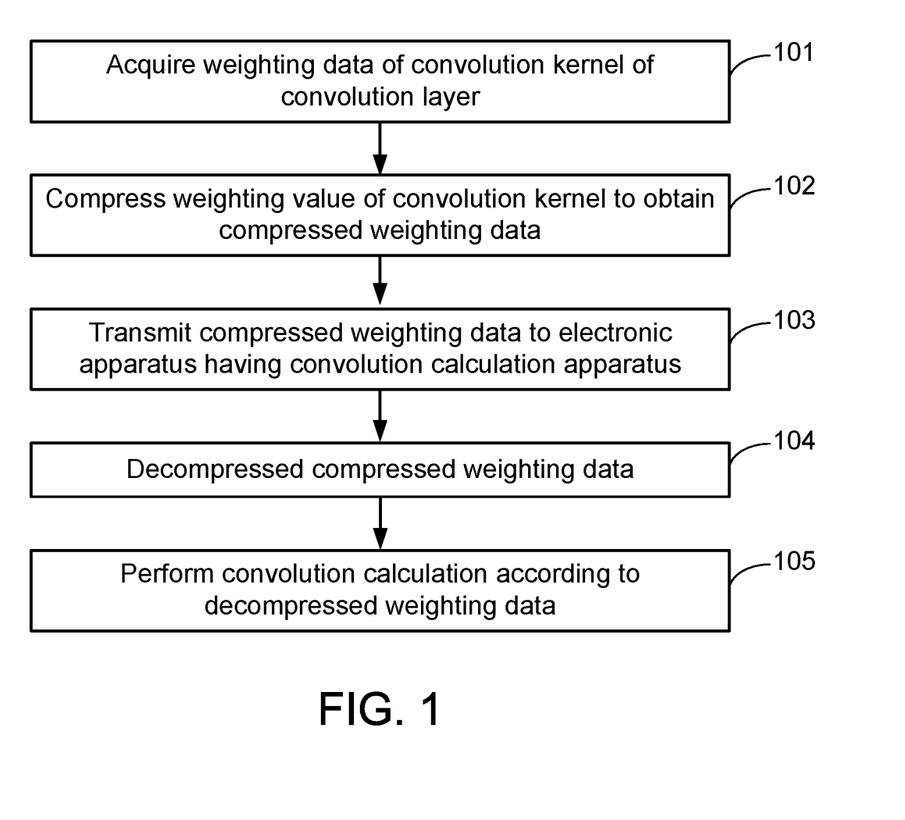
FIG. 1 is a flowchart of a data processing method according to an embodiment of the present invention.

FIG. 1 shows a flowchart of a data processing method according to an embodiment of the present invention. Referring to FIG. 1, the method is described in detail below.

In step 101, weighting data of a convolution kernel corresponding to a convolution layer of a trained calculation model is acquired, wherein the calculation model may be a convolutional neural network (CNN).

In step 102, the weighting data of the convolution kernel is compressed to obtain compressed weighting data. In one embodiment, step 101 and step 102 are performed by a processor executing a specific program code, and the processor is not in the convolution calculation apparatus; that is to say, step 101 and step 102 are compression processing of the weighting data of the convolution kernel in advance by a processor outside the convolution calculation apparatus. In practice, the compression format for compressing the weighting data of the convolution kernel may be a Huffman compression format.

In step 103, the compressed weighting data is transmitted to an electronic apparatus having a convolution calculation apparatus, for example, transmitting the compressed weighting data to a memory of the electronic apparatus.

In one embodiment, the weighting data compressed in advance is transmitted to an electronic apparatus needing to use the weighting data. In practice, the compressed weighting data is stored in a first block of a memory of the electronic apparatus, and input data of the convolution layer corresponding to the weighting data is stored in a second block of the memory.

In step 104, the compressed weighting data is decompressed. In practice, a decompression circuit in the convolution calculation apparatus can decompress the compressed weighting data.

Figure 2:
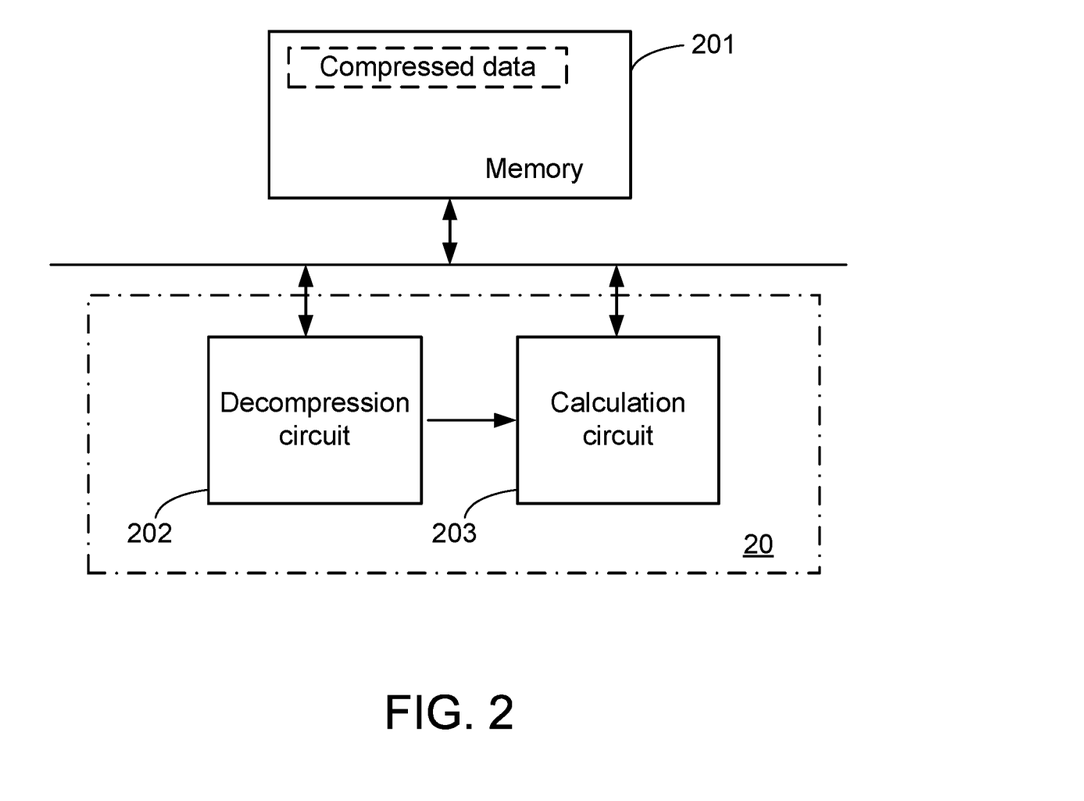
FIG. 2 is a block diagram of a convolution calculation apparatus according to an embodiment of the present invention.

FIG. 2 shows a block diagram of a convolution calculation apparatus according to an embodiment of the present invention. Referring to FIG. 2, the convolution calculation apparatus 20 is arranged in an electronic apparatus, a memory 201 of the electronic apparatus stores compressed weighting data corresponding to a convolution kernel of a convolution layer, and the memory 201 may also store input data of the convolution layer. When the convolution calculation apparatus 20 performs convolution operation, a decompression circuit 202 reads the compressed weighting data from the memory 201, and decompresses the compressed weighting data. If the compression format of the compressed weighting data is the Huffman compression format, the decompression circuit 202 can decompress the compressed weighting data according to a Huffman code table.

In step 105, convolution calculation is performed according to the decompressed weighting data. When the convolution calculation apparatus 20 performs convolution operation, a calculation circuit 203 performs convolution calculation according to the decompressed weighting data and the corresponding input data of the convolution layer.

It is known from the above, since the weighting data compressed in advance of the convolution kernel is transmitted to the electronic apparatus, when convolution operation is performed, the compressed weighting data is first decompressed and the convolution calculation apparatus in the electronic apparatus accordingly performs the convolution operation. Thus, the storage space and transmission bandwidth of the convolution kernel in the electronic apparatus are reduced, further saving system resources during convolution processing.

Figure 3:
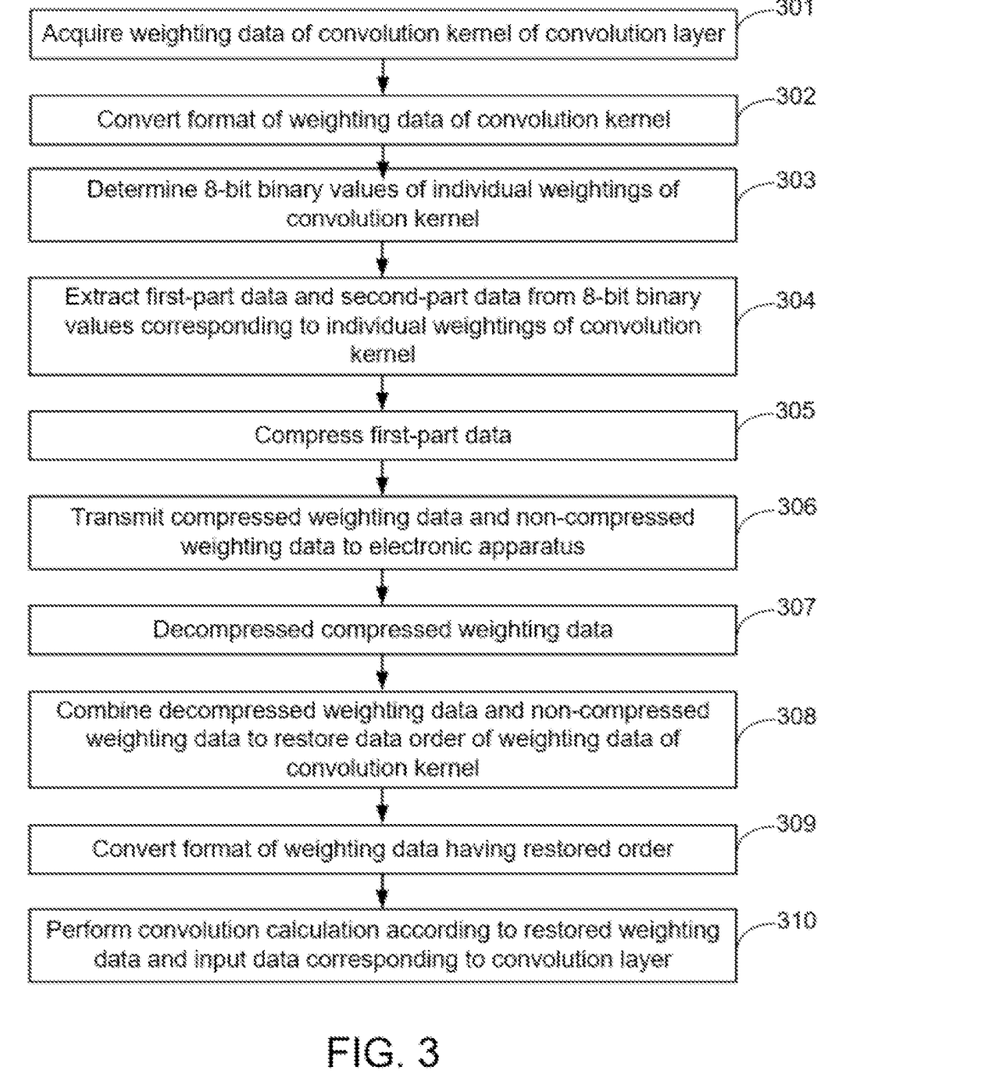
FIG. 3 is another flowchart of a data processing method according to an embodiment of the present invention.

FIG. 3 shows another flowchart of a data processing method according to an embodiment of the present invention. Referring to FIG. 3, the data processing method is described in detail below.

In step 301, weighting data of a convolution kernel corresponding to a convolution layer of a CNN is acquired.

Figure 4:
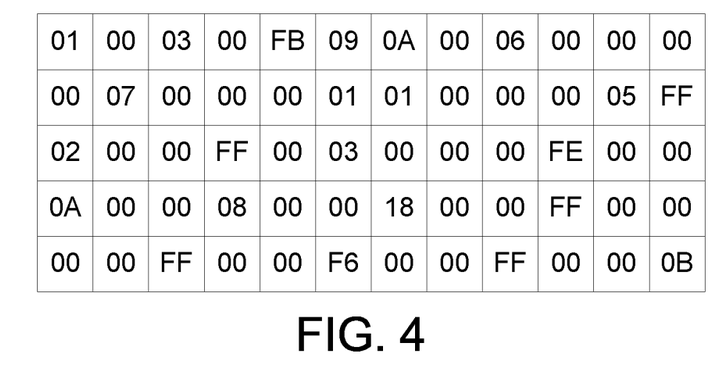
FIG. 4 is a schematic diagram of weighting data of a convolution kernel according to an embodiment of the present invention.

FIG. 4 shows a schematic diagram of weighting data of a convolution kernel according to an embodiment of the present invention. Referring to FIG. 4, weighting data of a convolution kernel of a convolution layer is a two-dimensional (2D) array of 5 rows and 12 columns, i.e., the convolution kernel includes a total of 60 weightings. In other embodiments, the convolution kernel may be a 2D array having other numbers of rows and columns, or the convolution kernel may be a three-dimensional or four-dimensional array.

In step 302, a format of the weighting data of the convolution kernel is converted. To further reduce the data amount, the format of the weighting data of the convolution kernel can be converted, for example, the weightings of the convolution kernel are converted from 2's complements to original numbers.

Figure 5:
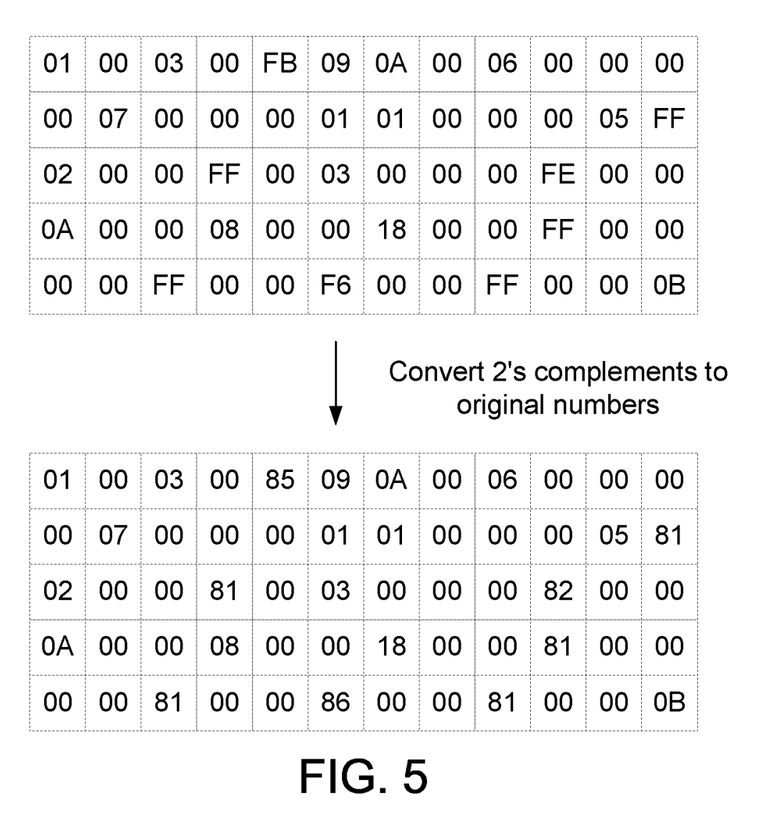
FIG. 5 is a schematic diagram of converting 2's complements to original numbers according to an embodiment of the present invention.

FIG. 5 shows a schematic diagram of converting weighting data from 2's complements to original numbers according to an embodiment of the present invention. Referring to FIG. 5, taking the weighting in the $1^{st}$ row and $5^{th}$ column of the convolution kernel for example, the 2's complement of the weighting is FB (the real number thereof being −5). The electronic apparatus can convert the weighting from the 2's complement FB to an original number 85. It should be noted that, the binary corresponding to the 2's complement FB is represented as 11111011, wherein 1111 at the four more significant bits represent F (hexadecimal), and 1011 at the four less significant bits represent B (hexadecimal). The 2's complement 11111011 converted to binary is 1000101. 1000 at the four more significant bits in the binary value 100000101 corresponds to 8 in the hexadecimal, and 0101 at the four less significant bits corresponds to 5 in the hexadecimal. Thus, the 2's complement FB is converted to the original number 85. It should be noted that, the 2's complement and original number of a positive number are the same.

Further, the weighting data of a convolution kernel in a computer apparatus is generally not stored in a hexadecimal form, but is stored in a binary form having multiple bits. For example, the weighting FB in the $1^{st}$ row and $5^{th}$ column of the convolution kernel in FIG. 4 is not stored in the form of FB in a computer apparatus, but is stored in a binary form having multiple bits.

In step 303, 8-bit binary values corresponding individual weighting data of the convolution kernel are determined according to a predetermined rule. After the format of the weighting data of the convolution kernel is converted, the 8-bit binary values corresponding to individual weighting data of the convolution kernel can be determined according to a predetermined rule. In one embodiment, the predetermined rule may be converting to numerals of two bits included in each weighting to corresponding 4-bits binary values, and the two 4-bit binary values obtained are combined into an 8-bit binary value.

For example, the weighting in the $1^{st}$ row and $5^{th}$ column of the convolution kernel is 85, wherein "8" in 85 corresponds a binary value 1000, and "5" corresponds to a binary value 0101, and so the binary value corresponding to the weighting 85 can be combined from 1000 and 0101, i.e., 10000101. For another example, the weighting in the $3^{rd}$ row and $4^{th}$ column of the convolution kernel is 81, wherein "8" in "81" corresponds to a binary value 1000, and "1" corresponds to a binary value 0001, and so the binary value corresponding to the weighting 81 may be combined from 1000 and 0001, i.e., 10000001.

In step 304, first-part data and second-part data are extracted from the 8-bit binary values corresponding to the individual weightings of the convolution kernel, wherein the first-part data is other digits except for the numeral of the most significant bit and the numerals of three least significant bits in the 8-bit binary value, and the second-part data includes the numeral of the most significant bit and the numerals of three least significant bits in the 8-bit binary value.

For example, the 8-bit binary value corresponding to the weighting 85 is 10000101, and thus the first-part data is 0000 (i.e., the $7^{th}$ bit, the $6^{th}$ bit, the $5^{th}$ bit and the $4^{th}$ bit in an incremental order), and the second-part data is 1101 (i.e., the $8^{th}$ bit, the $3^{rd}$ bit, the $2^{nd}$ bit and the $1^{st}$ bit in an incremental order). For another example, the 8-bit binary value corresponding to the weighting 81 is 10000001, and thus the first-part data is 0000 (i.e., the $7^{th}$ bit, the $6^{th}$ bit, the $5^{th}$ bit and the $4^{th}$ bit in an incremental order), and the second-part data is 1001 (i.e., the $8^{th}$ bit, the $3^{rd}$ bit, the $2^{nd}$ bit and the $1^{st}$ bit in an incremental order).

In step 305, the first-part data corresponding to the individual weightings is compressed. After the first-part data and the second-part data corresponding to individual weightings of the convolution kernel are obtained, the first-part data is losslessly compressed, and the compressed first-part data and the non-compressed second-part data can be stored separately; that is to say, the compressed first-part data is stored together in a centralized manner, and the non-compressed second-part data is also stored together in a centralized manner.

In one embodiment, the compression performed on the first-part data corresponding to the individual weightings can be Huffman compression. Huffman compression is a type of lossless compression, and is capable of representing characters having a higher appearance frequency by using a less bits and representing characters having a lower appearance frequency by using more bits, further achieving the object of data compression.

For example, "0000" in the first-part data of all the weightings has a highest appearance and "0000" is represented by the character "1" in Huffman coding, and so the object of compression of data of the convolution kernel can be achieved.

In step 302, the reason why the weighting in the convolution kernel is converted from a 2's complement to original numbers, the first-part data is extracted from the convolution kernel and the first-part data is compressed, is that the first-part data of the binary of a positive number and a negative number is the same, and so the compression rate of the data corresponding to the convolution kernel can be enhanced.

Figure 6:
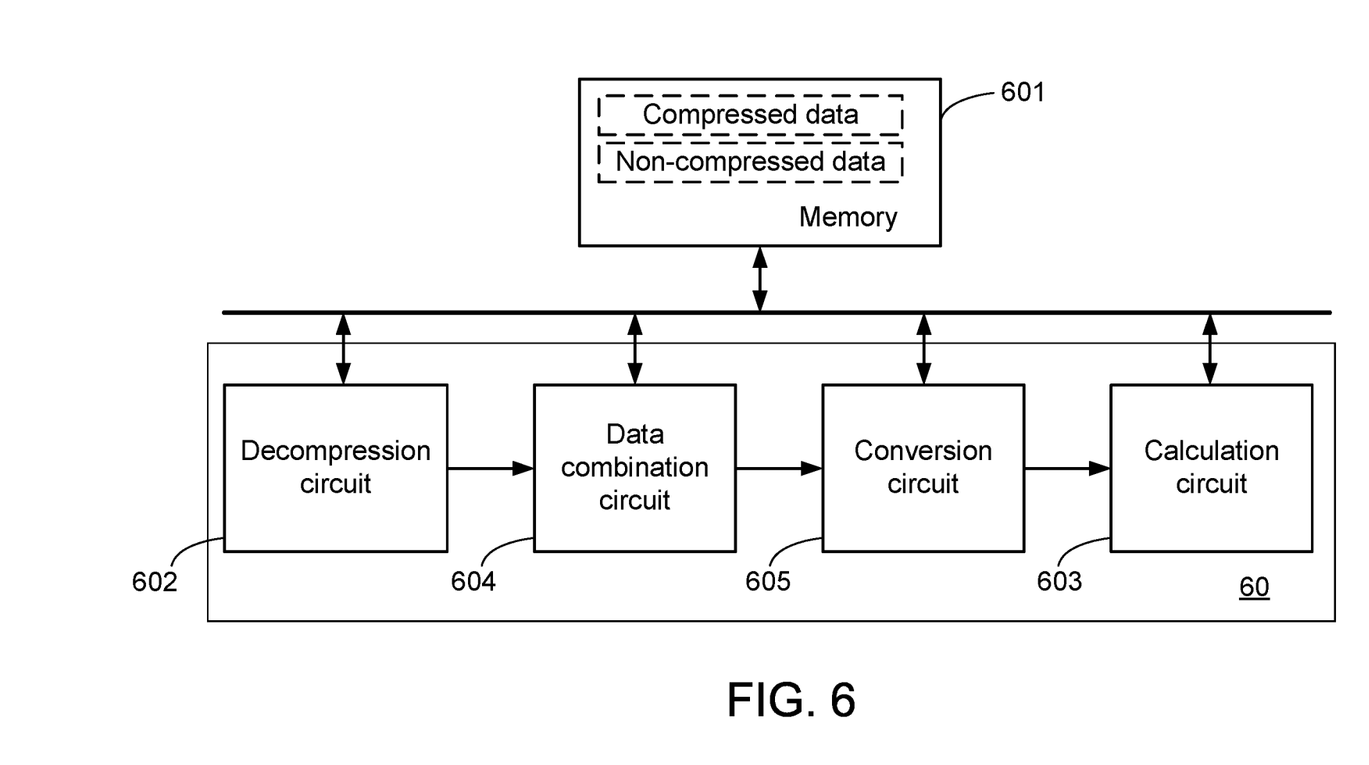
FIG. 6 is a block diagram of a convolution calculation apparatus according to another embodiment of the present invention.

In step 306, the compressed weighting data and the non-compressed weighting data are transmitted to an electronic apparatus needing to use the data. The electronic apparatus includes a convolution calculation apparatus, as shown in FIG. 6. FIG. 6 shows a block diagram of a convolution calculation apparatus according to another embodiment of the present invention. A convolution calculation apparatus 60 can use compressed weighting data and non-compressed weighting data stored in the electronic apparatus to perform convolution calculation. The compressed weighting data herein is the foregoing compressed first-part data, and the non-compressed data is the foregoing second-part data. In practice, the compressed weighting data and the non-compressed weighting data are stored in different blocks of a memory in the electronic apparatus, step 301 to step 306 are performed by a processor executing a specific program code, and the processor is not in the electronic apparatus including the convolution calculation apparatus 60.

In step 307, the compressed weighting data is decompressed. When the convolution calculation apparatus 60 performs convolution calculation, the decompression circuit 602 reads the compressed weighting data from the memory 601 and performs decompression. If the compression format of the compressed weighting data is a Huffman compression format, the decompression circuit 602 decompresses the compressed weighting data according to a Huffman code table, wherein the Huffman code table may be stored in a register. The decompression circuit 602 can store the first-part data corresponding to the individual weightings obtained after the decompression back to the memory 601 or directly output the first-part data to a data combination circuit 604.

In step 308, the decompressed weighting data and the non-compressed weighting data are combined to restore a data order of weighting data of the convolution kernel. In one embodiment, the first-part data corresponding to the individual weightings obtained after the decompression is stored in the memory 601, and the data combination circuit 604 alternatingly reads the first-part data and the second-part data (i.e., the non-compressed weighting data) from the memory 601 and re-orders the orders of data in the weightings of the two so as to restore the original order of the weighting data. In practice, the data combination circuit 604 performs a process reverse to a rule according to which the first-part data and the second-part data are fetched in step 304, so as to restore the original data of the weighting data.

In step 309, the format of the weighting data having the restored order is converted so as to restore an original format of the weighting data. The conversion circuit 605 performs format restoration of the weighting data having the restored order according to the format conversion performed in step 302. For example, if the weighting data in the convolution kernel is converted from a 2's complement to an original number in step 302, the conversion circuit 605 converts the original number in the weighting data having the restored order to a 2's complement so as to restore the weighting data to the original format. If another type of format conversion is performed on the weighting data before the compression, the conversion circuit 605 also performs a reverse format conversion process, so as to restore the weighting data to the original format. In practice, the conversion circuit 605 can also perform reverse format conversion on the decompressed weighting data before the first-part data and the second-part data are recombined.

In step 310, the calculation circuit 603 performs convolution calculation according to the restored weighting data and input data of the corresponding convolution layer.

In one embodiment, before the weighting data of the convolution kernel is compressed, it can be first determined whether the data amount of the weighting data of the convolution kernel is greater than a predetermined threshold, and if so, the weighting data corresponding to the convolution kernel is divided into blocks to obtain at least two blocks, and the two data blocks are then respectively compressed. It should be noted that, because the storage space of the convolution calculation apparatus is small, data corresponding to the convolution kernel can be first divided into blocks if the data amount of the convolution kernel is large, the individual blocks are then compressed, and the convolution calculation apparatus can decompress, combine and restore the compressed data corresponding to the individual blocks into one complete convolution kernel. In this embodiment, if the data corresponding to the convolution kernel needs to be divided into blocks, the electronic apparatus can perform unified Huffman compression coding on all the data blocks obtained after dividing the data, that is, the convolution kernel of the same convolution layer corresponds to only one Huffman code table.

In one embodiment, the compression performed on the first-part data corresponding to the individual weightings can include two phases—the first phase is converting the first-part data corresponding to the individual weightings into hexadecimal compressed characters, and the second phase is acquiring compressed characters corresponding to all the weightings of the convolution kernel and encoding and compressing all the compressed characters to obtain compressed data and a decompression mapping relationship table, wherein the decompression mapping relationship table contains records of the compressed characters and the corresponding compression codes. In practice, the second-part data corresponding to the individual weighting can also be converted to hexadecimal target characters. The convolution calculation apparatus performs a corresponding reverse process to restore the original weighting data.

In one specific embodiment, after the conversion from 2's complements to original numbers, the first-part data corresponding to the individual weightings is converted to hexadecimal compressed characters. For example, the first-part data corresponding to the weighting 85 is 0000, the hexadecimal character corresponding to the first-part data 0000 is 0, and so 0 is the corresponding compressed character obtained by converting the first-part data of the weighting 85. For another example, the first-part data corresponding to the weighting 81 is 0000, the corresponding hexadecimal character corresponding to the first-part data 0000 is 0, and so 0 is the corresponding compressed symbol obtained by converting the first-part data of the weighting 81.

After the compressed symbols corresponding to all the weightings in the convolution kernel are obtained, Huffman coding compression can be performed on all the compressed symbols to further obtain the compressed data and a decompression relationship mapping table. The decompression mapping relationship table contains records of the compressed symbols and the corresponding Huffman codes, and is the Huffman code table used for decompression.

Figure 7:
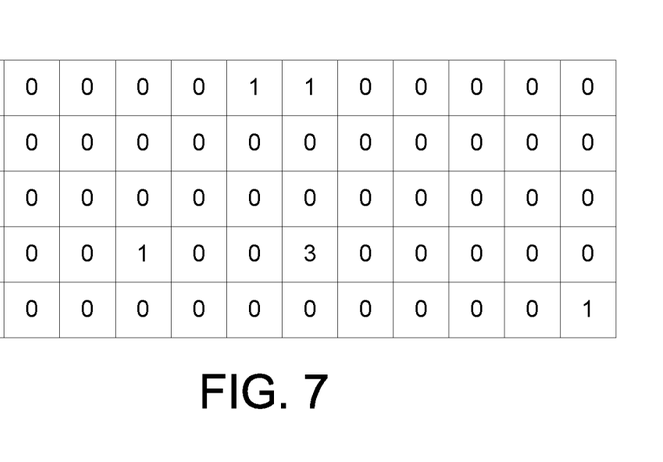
FIG. 7 is a schematic diagram of compressed characters corresponding to weighting data according to an embodiment of the present invention.

For example, a two-dimensional (2D array) obtained by arranging the compressed symbols corresponding to all weightings of the convolution kernel according to column and row positions in the convolution kernel is as shown in FIG. 7.

FIG. 7 shows a schematic diagram of compressed characters corresponding to weighting data. That is, in FIG. 7, the character in the $1^{st}$ row and $1^{st}$ column in the 2D array is the corresponding compressed character in a $1^{st}$ row and $1^{st}$ column in a second convolution kernel, the character in the $1^{st}$ row and $2^{nd}$ column in the 2D array is the corresponding compressed character in the $1^{st}$ row and $2^{nd}$ column in the second convolution kernel, and so forth.

After all the compressed characters are acquired, Huffman coding compression can be performed on these compressed characters to obtain the compressed data and the Huffman code table used for decompression. For example, because "0" among all the compressed characters appears 54 times, "1" appears 5 five times, and "3" appears once, it can then be obtained by constructing a Huffman tree that, the Huffman code corresponding to "0" can be "1", the Huffman code corresponding to "1" can be "01", and the Huffman code corresponding to "3" can be "00".

Figure 8:
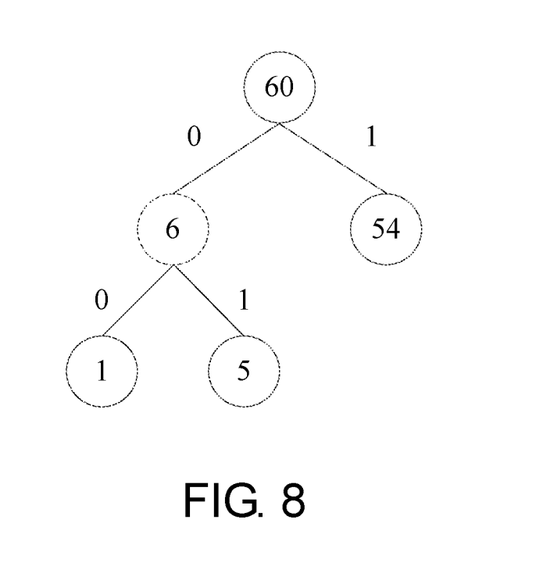
FIG. 8 to FIG. 14 are schematic diagrams of scenarios of a data processing method according to an embodiment of the present invention.
Figure 9:
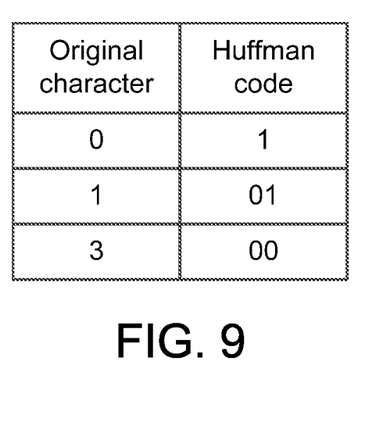

FIG. 8 and FIG. 9 show schematic diagrams of scenarios of a data processing method according to an embodiment of the present invention. The Huffman tree can be as shown in FIG. 8, and the Huffman code table can be as shown in FIG. 9.

Moreover, the second-part corresponding to the individual weightings of the convolution kernel can be converted to hexadecimal target characters. Thus, when the convolution calculation apparatus needs to later perform decompression on the compressed convolution kernel, the convolution calculation apparatus can decompress the compressed data into compressed characters corresponding to the individual weightings, and restore the compressed characters corresponding to the individual weightings into the first-part data corresponding to the individual weightings. Meanwhile, the convolution calculation apparatus can restore the target characters corresponding to the individual weightings into second-part data corresponding to the individual weightings. Then, the convolution calculation apparatus performs data recombination and format conversion of the first-part data and the second-part data so as to restore the original weighting data.

It should be understood that the method of converting both the first-part data and the second-part data to hexadecimal characters can further enhance the compression rate and further reduce the bandwidth for transmitting the compressed convolution kernel.

Figure 10:
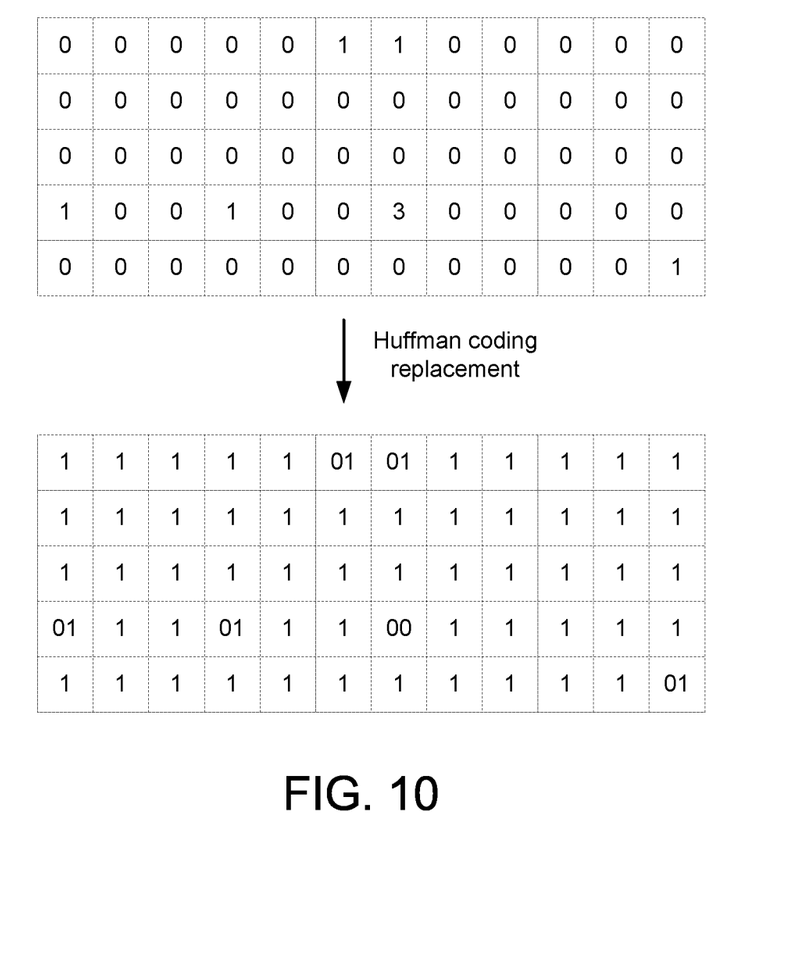
Figure 11:
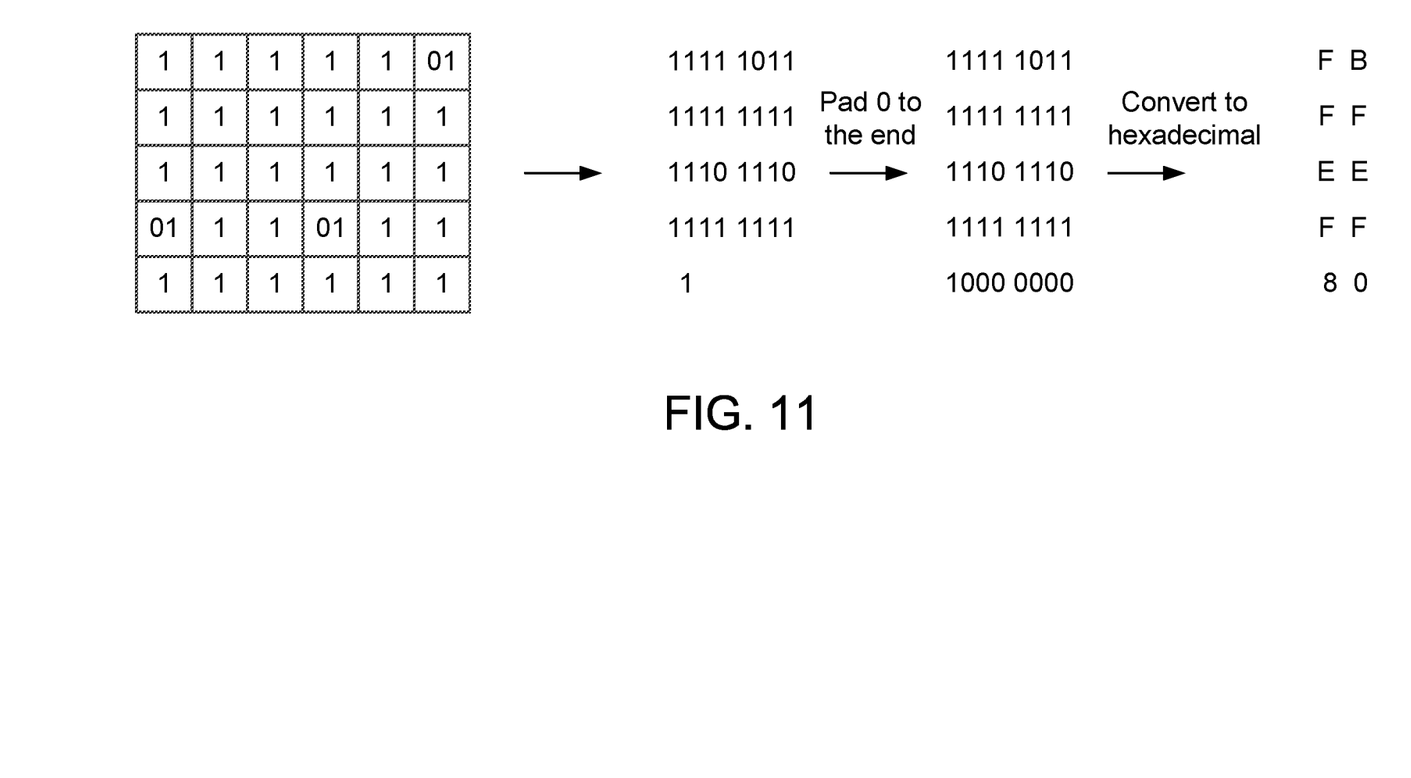
Figure 12:
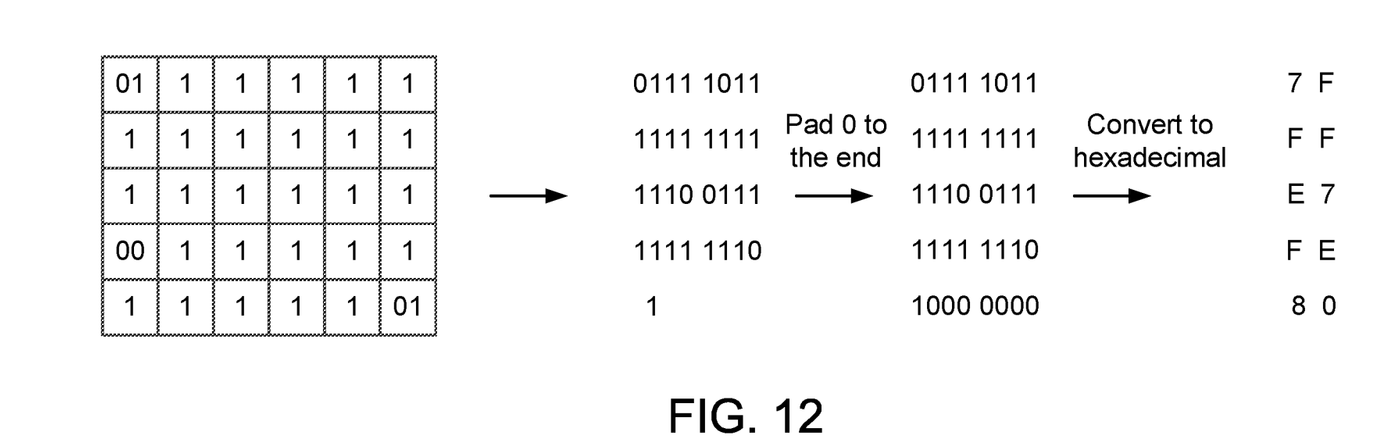

In one embodiment, to further reduce the transmission bandwidth, the data having been processed by Huffman compression can be further compressed according to the following method. For example, an array of the compressed characters obtained from converting the first-part data of the individual weightings by Huffman coding compression can be as shown in FIG. 10. FIG. 10 shows a schematic diagram of a scenario of a data processing method according to an embodiment of the present invention. For example, the compressed Huffman data in this embodiment is divided into two data blocks, that is, the $1^{st}$ to $6^{th}$ columns are the first data block, and the $7^{th}$ to $12^{th}$ columns are the second data block, wherein the first data block and the second data block each occupy 15 bytes. In this embodiment, for the first data block, every four characters are captured according to an order from left to right and from top to bottom as one part, and those less than four characters are padded by 0 at the end so as to convert the first data block (a total of 33 characters) into 10 parts, and the characters of each part is converted to a hexadecimal character. Thus, the first data block is converted to the following characters: FBFFEEFF80, as shown in FIG. 11. FIG. 11 shows a schematic diagram of scenario of a data processing method according to an embodiment of the present invention. It should be understood that, FBFFE-EFF80 occupies a total of 5 bytes in the electronic apparatus. Similarly, in this embodiment, for the second data block, every four characters are captured according to an order from left to right and from top to bottom as one part, and those less than four characters are padded by 0 at the end to convert the second data block (a total of 33 characters) into 10 parts, and the characters of each part is converted to a hexadecimal character. Thus, the second data block is converted to the following characters: 7FFFE7FE80, as shown in FIG. 12. FIG. 12 shows a schematic diagram of scenario of a data processing method according to an embodiment of the present invention. It should be understood that, 7FFFE7FE80 occupies a total of 5 bytes in the electronic apparatus. By the method above, the compressed data corresponding to the first-part numerals of the convolution kernel is further compressed from the original 30 bytes into 10 bytes, hence enhancing the compression rate.

Figure 13:
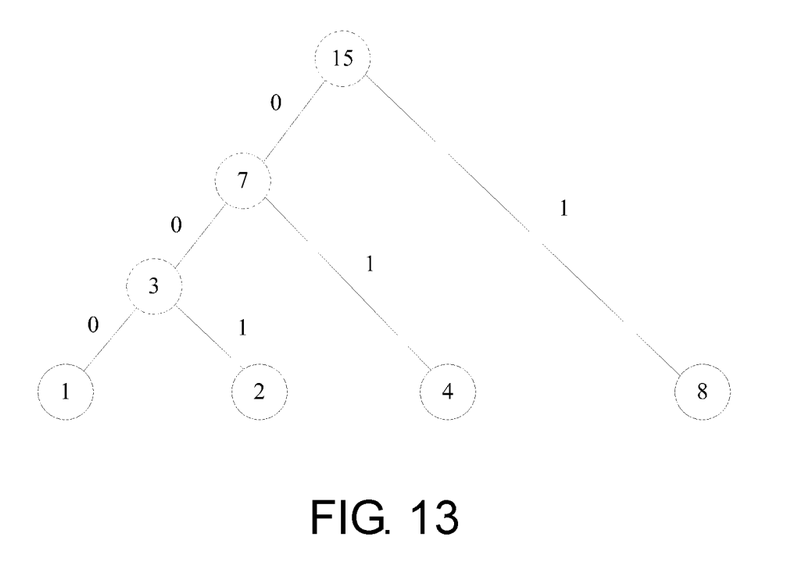
Figure 14:
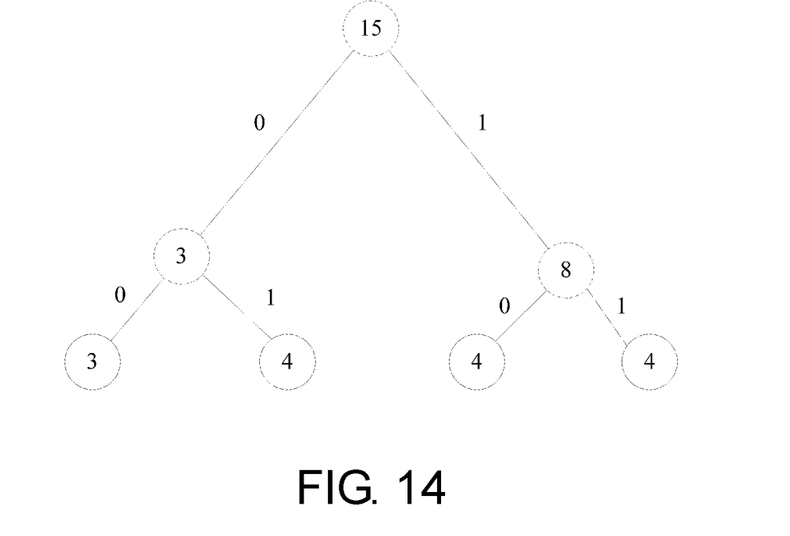

In one embodiment, if 4-bit Huffman coding compression is performed on the first-part data, the maximum length of the Huffman code is then 15 bits (i.e., $2^4-1$). If the convolution calculation apparatus has only 32 bits as a code list unit, wherein 4 bits are used for counting, 14 bits are used for masking, only 14 bit remain to serve as code values; that is to say, only a maximum of 14 bits are available for presenting code values. In an encounter of 15 bits, the Huffman tree needs to be modified so that the maximum bit if the modified Huffman tree is 14 bits. For example, the Huffman tree is modified by the following method to change the frequency of four characters having a lowest appearance frequency among all the characters, so that the number of layers of the Huffman tree is reduced by one layer, and the Huffman code in the longest length of 15 bits is reduced to 14 bits. For example, the four characters having the lowest appearance frequencies are sequentially 1, 2, 4 and 8, the shape of the Huffman tree corresponding to the four characters may then be as shown in FIG. 13. In the present invention, the frequency values of these four characters are modified to 3, 4, 4 and 4, and so the shape of the Huffman tree corresponding to the four characters is changed to that shown in FIG. 14. FIG. 13 and FIG. 14 show schematic diagrams of scenarios of a data processing method according to an embodiment of the present invention. By comparing FIG. 13 and FIG. 14, it is seen that the number of layers of the Huffman tree is reduced by one layer, and so the longest Huffman code is reduced by 15 bits to 14 bits. It should be noted that, FIG. 13 and FIG. 14 only depict Huffman trees associated with the four characters having the lowest appearance frequencies, and schematic diagrams of nodes of Huffman trees corresponding to the remaining characters are not depicted. It should be noted that, although the frequency value is changed, the characters and the corresponding codes in the Huffman code table are still correct and do not cause any errors.

The data processing method and the convolution calculation apparatus provided according to the embodiments of the present application are as described in detail above. The principle and implementation details of the present application are described by way of specific examples in the literature, and the illustrations given in the embodiments provide assistance to better understand the method and core concepts of the present application. Variations may be made to specific embodiments and application scopes by a person skilled in the art according to the concept of the present application. In conclusion, the disclosure of the detailed description is not to be construed as limitations to the present application.

What is claimed is:

1. A convolution calculation apparatus, applied for convolution calculation of a convolution layer, the apparatus comprising:
a decompression circuit, decompressing compressed weighting data of a convolution kernel of the convolution layer to generate decompressed weighting data;
a data combination circuit, combining the decompressed weighting data and non-compressed data of the convolution kernel to restore a data order of weighting data of the convolution kernel;
a calculation circuit, performing calculation according to the weighting data of the convolution kernel and input data of the convolution layer; and
a conversion circuit, coupled between the data combination circuit and the calculation circuit, performing format conversion on the weighting data of the convolution kernel, and outputting the converted weighting data to the calculation circuit.

2. A convolution calculation apparatus, applied for convolution calcalution of a convolution layer, the apparatus comprising:
a decompression circuit, decompressing compressed weighting data of a convolution kernel of the convolution layer to generate decompressed weighting data;
a data combination circuit, combining the decompressed weighting data and non-compressed data of the convolution kernel to restore a data order of weighting data of the convolution kernel; and
a calculation circuit, performing calculation according to the weighting data of the convolution kernel and input data of the convolution layer,
wherein the weighting data of the convolution kernel comprises first-part data and second-part data, the compressed weighting data corresponds to the first-part data and the non-compressed weighting data corresponds to the second-part data.

3. The convolution calculation apparatus according to claim 2, wherein the weighting data of the convolution kernel consists of a plurality of 8-bit binary values, and the first-part data of the weighting data consists of at least 2-bit binary values in each of the 8-bit binary values.

4. The convolution calculation apparatus according to claim 1, wherein the compressed weighting data is compressed by using a Huffman compression format, and the decompression circuit decompresses the compressed weighting data according to a Huffman code table.

5. The convolution calculation apparatus according to claim 1, wherein the compressed weighting data is stored in a first block of a memory, the non-compressed weighting data is stored in a second block of the memory, and the first block is different from the second block.

6. The convolution calculation apparatus according to claim 1, wherein the compressed weighting data is compressed by a device outside an electronic apparatus provided with the convolution calculation apparatus.

7. A convolution calculation apparatus, applied for convolution calculation of a convolution layer, the apparatus comprising:
a decompression circuit, decompressing compressed weighting data of a convolution kernel of the convolution layer to generate decompressed weighting data;
a calculation circuit, performing calculation according to the decompressed weighting data and input data of the convolution layer; and
a conversion circuit, coupled between the decompression circuit and the calculation circuit, performing format conversion on the decompressed weighting data, and outputting the converted weighting data to the calculation circuit;
wherein, the compressed weighting data and the input data are respectively stored in different blocks of a memory.

8. The convolution calculation apparatus according to claim 7, wherein the compressed weighting data is compressed by using a Huffman compression format, and the decompression circuit decompressed the compressed weighting data according to a Huffman code table.

9. The convolution calculation apparatus according to claim 7, wherein the compressed weighting data is compressed by a device outside an electronic apparatus provided with the convolution calculation apparatus.

* * * * *